Jan. 7, 1969 J. B. LOVETT 3,419,934
DISPENSING APPARATUS
Filed Jan. 5, 1967 Sheet 1 of 2

INVENTOR.
Joe B. Lovett
BY
ATTORNEY
AGENT

United States Patent Office 3,419,934
Patented Jan. 7, 1969

3,419,934
DISPENSING APPARATUS
Joe B. Lovett, Sweeney, Tex., assignor to The Dow Chemical Company, Midland, Mich., a corporation of Delaware
Continuation-in-part of application Ser. No. 450,816, Apr. 26, 1965. This application Jan. 5, 1967, Ser. No. 613,711
U.S. Cl. 18—4    12 Claims
Int. Cl. B29b 5/00

ABSTRACT OF THE DISCLOSURE

A dispensing apparatus, primarily for low viscosity liquids, is disclosed. The apparatus employs a hollow housing having a dispensing slot and a helically grooved rotor. The rotor provides a traverse of the discharge stream across the discharge slot for each rotation of the rotor.

---

This application is a continuation-in-part of my co-pending application Ser. No. 450,816, filed Apr. 26, 1965, now abandoned.

This invention relates to a dispensing apparatus. It more particularly relates to a dispensing apparatus suited for depositing a liquid composition in the form of a broad sheet on a supporting means such as a conveyor.

Oftentimes in the preparation of plastic or synthetic resinous foam articles, such as polyurethane foams, where two components are admixed and a rapid chemical reaction takes place, it is difficult to obtain adequate mixing and rapid distribution of the material into a sheet-like configuration prior to forming and curing. Certain foam materials are made by rapidly admixing two reactive components into a single stream. The stream is then deposited on a moving belt or trough where foaming and curing rapidly occurs. Relatively thick sections, that is, sections 12 inches in thickness and about 4 feet in width are readily prepared by employing a nozzle which moves back and forth over a moving belt or trough. The quantity and viscosity of the foamable composition is sufficient that a relatively uniform layer of foamable material is then deposited and the resultant material is generally leveled by gravity prior to hardening. However, when thin sections, such as foam sheet or planks having a thickness of about 1 inch to about 6 inches or even less is prepared using basically the same technique, non-uniformities appear often in the product which are traceable to the lack of a uniform distribution of the foamable material due to a transversely reciprocating dispensing nozzle. Inventory of the mixed components must be maintained at a minimum and yet uniformity of the sheet is highly desirable. Generally in commercial practice, it is necessary to remove such non-uniformities and discard a portion of the material as scrap. Many foam forming devices employ a traversing spray nozzle which do not provide a commercially successful distribution of the foam components as oftentimes there are significant problems encountered with regard to overspray, splatter and the like when used to prepare thin sections. Oftentimes, the depth of the liquid is insufficient to permit leveling by means of gravity when viscous foam forming components are employed.

It would be desirable if there were available an apparatus for dispensing a liquid in the form of a relatively broad sheet in a uniform manner.

It would be further advantageous if such an apparatus permitted rapid distribution and required a very small inventory of material therein.

It would also be advantageous if such a distributing apparatus were of relatively simple mechanical construction.

These benefits and other advantages are achieved in an apparatus in accordance with the present invention which comprises a hollow housing having a generally circular configuration defining therein a cavity, the cavity having a longitudinal axis, and the cavity having a generally circular cross-sectional configuration, the housing defining a slot generally parallel to the longitudinal axis of the cavity, the slot providing communication between the cavity and the exterior of the housing, a rotor disposed within the cylindrical cavity, the rotor being rotatably mounted within the cavity, and the rotor having an external surface which generally conforms to the configuration of the cavity, the rotor defining at least one helical slot adapted to communicate with the longitudinal slot of the housing as the rotor is rotated, means to provide communication between the helical slot and a source of liquid to be dispensed.

Further features and advantages in accordance with the present invention will become more apparent from the following specification when taken in connection with the drawing wherein:

FIGURE 1 schematically illustrates a rotary valve and discharge device in accordance with the present invention in cooperative combination with a synthetic resinous foam-making apparatus.

Figure 1:
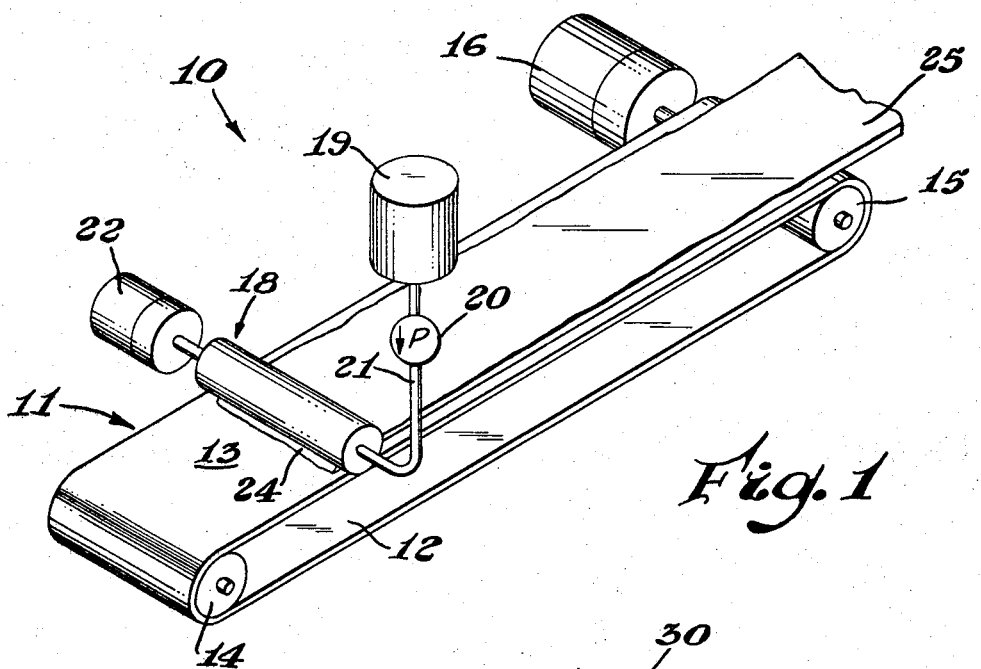

In FIGURE 1 there is schematically illustrated a resinous foam-making apparatus generally designated by the reference numeral 10. The apparatus 10 comprises in cooperative combination a conveyor 11. The conveyor 11 comprises a conveying belt 12 having a casting surface 13, and the belt 12 is supported by an idler drum 14 and a driving drum 15. The driving drum 15 is in operative combination with a drive means or gear motor 16. A foamable material dispensing assembly 18 is disposed generally adjacent the idler pulley 14 and the upper portion of the casting surface 13 of the belt 12. The dispensing assembly 18 is in operative communication with a foamable material source 19 by means of a pump 20 and a conduit 21. A dispensing assembly drive means 22 is operatively coupled to the dispensing assembly 18. The dispensing assembly 18 discharges a sheet-like stream 24 of a foamable hardenable material onto the casting surface 13 of the conveyor belt 12. The stream of foamable material 24 foams and hardens to form a foamed sheet 25.

Figure 2:
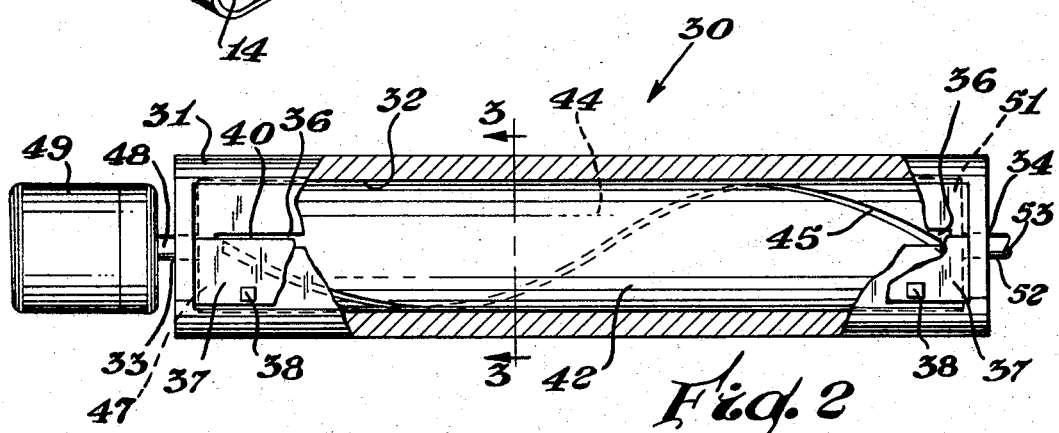
FIGURE 2 is a cutaway view of a foam dispensing apparatus in accordance with the present invention.

In FIGURE 2 there is illustrated a sectional view of a dispensing assembly generally designated by the reference numeral 30. The assembly 30 is generally similar to the assembly 18 of FIGURE 1. The dispensing rotary valve assembly 30 comprises in cooperative combination a hollow housing 31 defining therein a generally hollow cylindrical cavity 32, a first rotor bearing 33 and a second rotor bearing 34. The housing 31 also defines a generally axially disposed elongated slot 36. The slot 36 is in full communication with the cavity 32. A blade 37 comprises a portion of the housing 31 and is moveably secured adjacent the slot 36 by means of the retaining screws 38. The blade 37 in cooperative combination with a portion of the housing defining the slot 36 defines a narrow extrusion orifice 40. A hollow rotor 42 is rotatably disposed within and has dimensions generally conforming to the cavity 32. The rotor 42 defines an internal cavity 44, a generally helically disposed slot or opening 45 providing communication between the cavity 44 of the rotor 42 and the cavity 32 of the housing 31. The helical groove 45, as illustrated in FIGURE 2, rotates about the generally cylindrical outer surface of the rotor 42 for about 360°. The helical slot 45 extends along the rotor 42 for a distance about equal to the axial length of the slot 36. The rotor 42 has a first end 47 which has affixed thereto a shaft 48 adapted to engage the rotor bearing 33. The shaft 48 is operatively connected to a rotating means or motor 49. The rotor 42 has a second end 51. The second end 51 is axially secured to a hollow shaft 52 adapted to rotate in the bearing 34. The hollow shaft 52 defines a generally axially disposed passageway 53 which is in full communication with the cavity 44 of the rotor 42.

Figure 3:
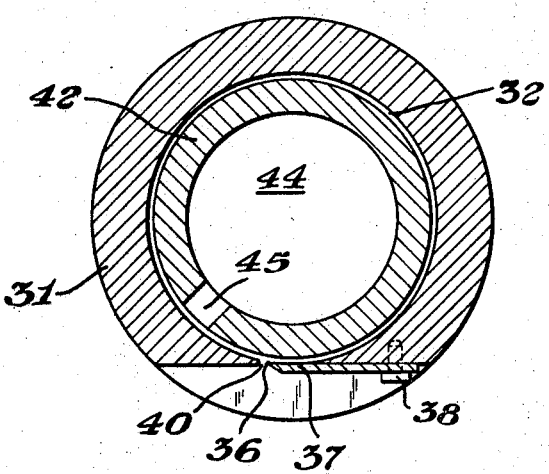
FIGURE 3 is a sectional view of the apparatus of FIGURE 2 taken along the line 3—3.

In FIGURE 3 there is illustrated a cross-sectional view of the dispensing assembly 30 taken along the line 3—3 of FIGURE 2, wherein the relationship of the housing 31, rotor 42 and the plate 37, together with the slot 36 are more clearly illustrated.

In operation of the apparatus in accordance with the present invention as illustrated in FIGURES 2 and 3, a foamable hardenable composition is pumped into the cavity 44 of the rotor 42 by means of the passageway 53 through a swivel joint (not shown) from a resin source, such as the resin source 19 of FIGURE 1. The slot 45 of the rotor 42 is in register with the elongated slot 36 at some point along the length of the housing 31. The hardenable material flows into the slot at this point. The rotor 42 is rapidly rotated within the cavity 32 causing each point of the slot 45 to be in register with the slot 36, once for each revolution of the rotor. There is some portion of the slot 45 in contact with the slot 36 at all times. Thus, a viscous material, such as a foamable polyurethane composition is injected into the slot 36 and simultaneously discharged through the oriticce 40 onto the casting surface 13 of the conveying belt 12, in a substantially linear manner with each revolution of the rotor. When foamable compositions are employed or viscous compositions and the rate of revolution of the rotor is high, that is, above about 300 revolutions per minute for a rotor having dimensions substantially as shown in FIGURE 3, a smooth and generally uniform sheet of foamable liquid is deposited on the belt. In practical operation, the thinner the sheet being prepared, the more rapid rotation of the rotor is required for an apparently uniform product.

Figure 4:
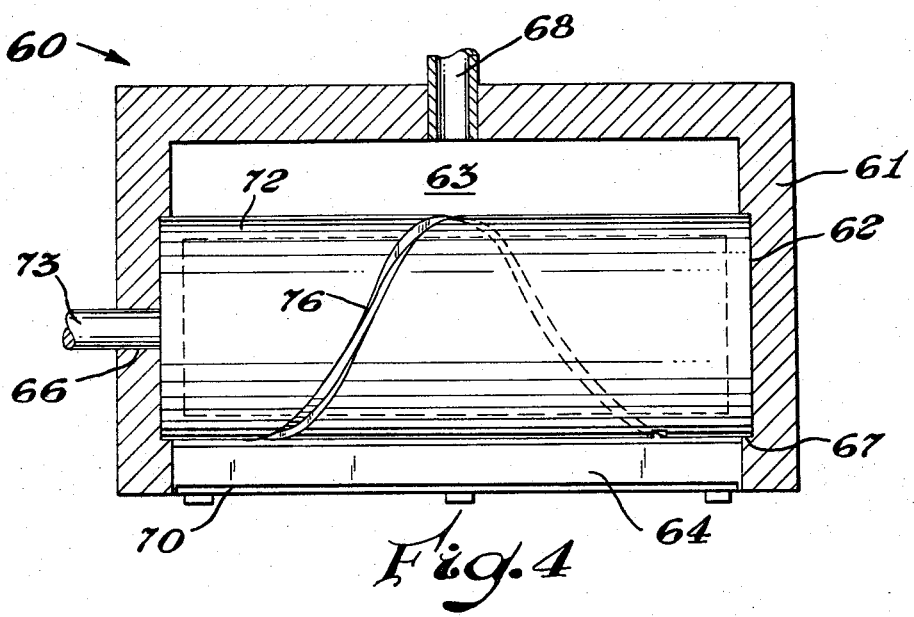
FIGURE 4 is a cutaway view of an alternate embodiment of the invention.

In FIGURE 4 there is illustrated a sectional view of an alternate embodiment of the invention generally designated by the reference numeral 60. The dispensing means 60 comprises a housing 61 having defined therein a generally cylindrical cavity 62, an elongate supply plenum 63 and a discharge slot 64. Also defined within the housing is a first bearing means 66 and a second bearing means 67. The bearing means 66 and 67 are generally coaxially arranged with respect to the cavity 62. A liquid supply passageway or conduit 68 is in operative communication with the supply plenum 63. An adjustable blade or dam 70 is affixed to the housing 61 adjacent the discharge slot 64 substantially in the same manner as illustrated in FIGURE 3 to define an extrusion orifice or slot (not shown). A solid rotor 72 having substantially the dimensions of the cylindrical cavity 63 is rotatably disposed therein. The rotor 72 is provided with a drive shaft 73. The rotor 72 defines a generally helically disposed slot 76 extending around the rotor 72 for about 360°. The slot 76 provides communication between the supply plenum 63 and the discharge plenum 64.

In operation of the embodiment of FIGURE 4, the rotary valve dispensing assembly 60 is provided with a liquid to be dispensed through the passageway 68 into the plenum 63. The fluid or liquid under pressure from the cavity 63 passes into and through the helical groove 76 into the slot 64 and is simultaneously discharged through a slot-like extrusion orifice (not shown) defined by the blade 70, and the housing 61 onto the casting surface of the conveying belt. The slot 76 extends about the rotor 72 for a distance sufficient to permit discharge from one location at a time from the extrusion orifice or slot. The discharge is therefore in the form of a single traversing stream when relatively low viscosity (below about 2000 centipoises) liquid is employed.

Figure 5:
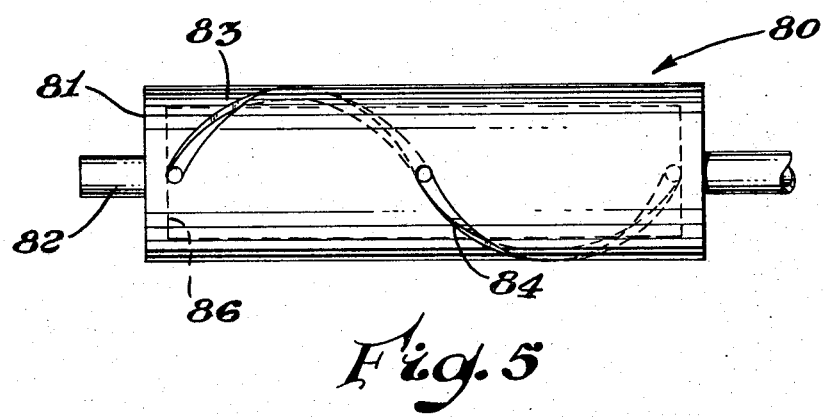
FIGURE 5 is a view of an alternate embodiment of a rotor for an assembly in accordance with the present invention.

In FIGURE 5 there is illustrated an alternate configuration of a rotor 80 suitable for use in the practice of the present invention. The rotor 80 comprises a generally cylindrical body 81 having a drive shaft 82 and a first generally helically disposed slot 83, a second helically disposed slot 84, an internal cavity 86 in full communication with the helical slots 83 and 84. Slots 83 and 84 provide communication between the external surface of the rotor 80 and the internal cavity 86. Employing a rotor in accordance with FIGURE 5, greater rigidity is achieved than when employing a single helical slot which traverses 360° of the rotor. Alternately, the slots in the rotor may assume a wide variety of configurations. A plurality of slots which extend a relatively short angular distance but are disposed in such a manner that the dispensing is equivalent to at least that of a 360° slot are satisfactory. The main function of the slotted rotor is to provide a path for the foamable material such that a uniform amount of the material is deposited across the width of the casting surface. Beneficially employing the embodiment of FIGURE 4, if the diameter of the rotor is small relative to the length of the housing, it is oftentimes desirable to utilize helical slots of opposite hand. As the viscosity of the material to be handled decreases, the need for internal feeding of the rotor decreases and a low viscosity material, for example, in the embodiment of FIGURE 4, may be dispensed by using a solid rotor having helical grooves on the outer surface wherein all the liquid flow is confined to the grooves and an internal cavity is not employed.

Figure 6:
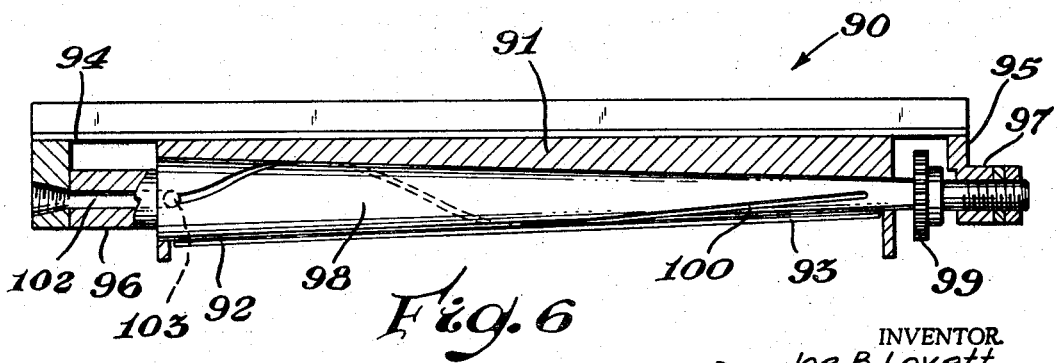
FIGURE 6 is a sectional view of an alternate embodiment of the invention.

In FIGURE 6 there is schematically illustrated an alternate embodiment of the invention generally designated by the reference numeral 90. The apparatus 90 comprises a housing 91 having defined therein a generally conical cavity 92 of circular cross-section. The housing 91 defines an extrusion slot 93 which extends generally parallel to the axis of the conical cavity 92. The housing 91 has a first end 94 and a second end 95. The first end 94 defines a rotor bearing 96 whereas the second end 95 defines a rotor bearing 97. A rotor 98 is rotatably positioned within the conical cavity 92 and conforms generally to the cavity. The rotor 98 is rotatably supported in the bearings 96 and 97. A drive means or sprocket 99 is affixed to the rotor generally adjacent the bearing 97. The rotor 98 defines a generally helical groove 100 in the generally conical portion thereof. The helical groove extends about the rotor 98 not more than about 360°. An axial passage 102 is defined within the rotor generally adjacent the first end of the housing. The passage 102 is adapted to communicate with a source of liquid to be dispensed. The axial passageway 102 is in communication with the helical groove 100 by means of a generally radial passageway 103.

In operation of the embodiment of FIGURE 6, the rotor 98 is rapidly rotated, the liquid material to be dispensed is passed into the axial passageway 102 where it flows through the generally radial passageway 103 and along the helical groove 100. Each time the helical groove comes in register with the slot 93, a portion of liquid is discharged therefrom. Thus, a rapidly traversing single discharge is obtained generally in the manner of the hereinbefore described embodiments of the invention. However, when employing viscous liquids which might tend to discharge at a greater rate adjacent the feed end of the dispensing device, a selection of a suitable taper for the rotor relative to the viscosity of the liquid being dispensed results in a uniform discharge rate across the entire width without the necessity of adjusting the blade to a non-uniform width. Although the radial velocity of the rotor is equal along its entire length, a groove of constant width such as the groove 100 is in register with the dispensing or extrusion slot for a relatively greater period of time at the small end of the rotor than at the large end. Thus, inequalities of supply pressure due to the pressure drop in the helical slot from the first end to the second end are compensated. For very high viscosity material, generally it is desirable to maintain the rotor with a minimum diameter and with maximum rigidity. It is possible, due to the viscous drag of the liquid, to mechanically deform a rotor if the forces applied thereto are too great.

Rotors in accordance with the present invention are found eminently satisfactory for the dispensing of formable hardenable liquid compositions such as polyurethane foams, paint and the like. When solid rotors, such as that of FIGURE 6, are employed with low viscosity liquids, it is essential, to obtain optimum distribution of the liquid from the extrusion slot, that the helical slot in the rotor should be adjacent the extrusion slot at only one location at any instant. Therefore, the slot should extend about the rotor only up to 360°.

As is apparent from the foregoing specification, the apparatus of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:
1. A dispensing apparatus comprising:
   a hollow housing having a generally circular configuration, the housing defining therein
   a cavity, the cavity having
   a longitudinal axis and a generally circular cross-sectional configuration, the housing defining
   a slot generally parallel to the longitudinal axis of the cavity, the slot providing communication between the cavity and the exterior of the housing,
   a rotor being rotatably disposed within the cylindrical cavity, the rotor having an external surface which generally conforms to the configuration of the cavity, the rotor being a hollow cylindrical body and defining at least one
   helical slot in the external surface thereof, the helical slot providing full communication between the internal and external surfaces of the rotor, the helical slot adapted to communicate with the longitudinal slot of the housing as the rotor is rotated,
   means to provide communication between the helical slot and a source of liquid to be dispensed.
2. The apparatus of claim 1 wherein the longitudinal slot is defined by the housing and an adjustably mounted blade secured to the housing.
3. The apparatus of claim 1 wherein the rotor is affixed to an axially disposed shaft, the shaft defining an axial passageway in communication with the internal surface within the rotor.
4. The apparatus of claim 1 wherein the rotor defines a single helically disposed slot substantially commensurate in length with the length of the longitudinal slot of the housing.
5. The apparatus of claim 1 wherein the housing defines an inlet plenum in full communication with the cylindrical cavity, the inlet plenum being adapted to be in communication with a fluid source.
6. An apparatus for the preparation of a sheet-like foam plastic body comprising in cooperative combination:
   a conveyor having a casting surface,
   means to forward said casting surface,
   a dispensing apparatus in accordance with claim 1 disposed adjacent the casting surface and adapted to deliver a stream of foamable material thereto,
   means to provide foamable, hardenable plastic material in cooperative combination with the dispensing apparatus.
7. The apparatus of claim 1 wherein the rotor and housing cavity have a tapering configuration.
8. A dispensing apparatus comprising:
   a hollow housing, the housing defining therein
   a cavity, the cavity having
   a longitudinal axis and a generally circular cross-sectional configuration, the housing defining
   a slot generally parallel to the longitudinal axis of the cavity, the slot providing communication between the cavity and the exterior of the housing,
   a rotor rotatably disposed within the cavity, the rotor having an external surface which generally conforms to the configuration of the cavity, the rotor defining at least one
   helical slot in the external surface thereof, the helical slot extending about the rotor not more than 360°, the helical slot adapted to communicate with the longitudinal slot of the housing as the rotor is rotated,
   means to provide communication between the helical slot and the source of liquid to be dispensed.
9. The apparatus of claim 8 wherein the longitudinal slot is defined by the housing and an adjustably mounted blade secured to the housing.
10. The apparatus of claim 8 wherein the rotor is affixed to an axially disposed shaft, the shaft defines an axial passageway in communication with the helically disposed slot.
11. The apparatus of claim 8 wherein the rotor defines a single helically disposed slot substantially commensurate in length with the length of the longitudinal slot of the housing.
12. The apparatus of claim 8 wherein the housing defines an inlet plenum in full communication with the cylindrical cavity, the inlet plenum being adapted to be in communication with a fluid source.

References Cited

UNITED STATES PATENTS

| | | | |
|---|---|---|---|
| 1,924,010 | 8/1933 | Wickham | 18—15 |
| 2,330,282 | 9/1943 | Hazeltine et al. | 18—4 |
| 2,567,949 | 9/1951 | Lewis | 18—15 |
| 2,754,544 | 7/1956 | Bicher | 18—15 |
| 3,063,095 | 11/1962 | Limbach | 18—12 |
| 3,145,419 | 8/1964 | Reifenhauser | 18—12 |
| 3,181,199 | 5/1965 | Voellser | 18—4 |

WILLIAM J. STEPHENSON, *Primary Examiner.*

U.S. Cl. X.R.

18—12, 15